United States Patent
Yennaco (12) 
(10) Patent No.: US 6,717,595 B1
(45) Date of Patent: Apr. 6, 2004

(54) COMPUTER-BASED LIST EDITOR

(75) Inventor: Robert A. Yennaco, Woburn, MA (US)

(73) Assignee: Sun Microsystems, Inc., Palo Alto, CA (US)

(*) Notice: Subject to any disclaimer, the term of this patent is extended or adjusted under 35 U.S.C. 154(b) by 454 days.

(21) Appl. No.: 09/752,343

(22) Filed: Dec. 29, 2000

(51) Int. Cl.$^7$ ............................................. G06F 3/00
(52) U.S. Cl. ..................... 345/765; 345/825; 345/780
(58) Field of Search ............................ 345/765, 968, 345/825, 780, 826; 717/110; 715/503, 509, 530

(56) References Cited

U.S. PATENT DOCUMENTS

| | | | |
|---|---|---|---|
| 5,239,622 A | * 8/1993 | Best et al. | ............... 358/1.18 |
| 5,835,769 A | 11/1998 | Jervis et al. | |
| 6,330,006 B1 | * 12/2001 | Goodisman | ............... 345/762 |
| 6,356,954 B2 | * 3/2002 | Golding | ............... 709/310 |
| 6,381,644 B2 | * 4/2002 | Munguia et al. | ............... 709/225 |
| 6,405,225 B1 | * 6/2002 | Apfel et al. | ............... 715/526 |

* cited by examiner

*Primary Examiner*—John Cabeca
*Assistant Examiner*—Kieu D. Vu
(74) *Attorney, Agent, or Firm*—McCormick, Paulding & Huber LLP (57) ABSTRACT

Disclosed is a list editor component for allowing a computer user to arrange a collection of information items. The list editor component displays an editor window that includes a visual representation of a selected arrangement of information items of the collection. The list editor component can receive specification from the user of a new information item to be added to the collection, and user instruction, add the specified new item to the collection. Validation of the new item can be sought prior to adding the item or prior to exporting the item from the list editor component. The editor window can provide a standard graphical user interface responsive to a call from an application program. In one practice, the list editor component limits the application program such that the program cannot substantially vary the presentation of the graphical user interface, or the selected arrangement of information items.

34 Claims, 3 Drawing Sheets

COMPUTER-BASED LIST EDITOR

FIELD OF THE INVENTION

This invention relates to computers, and more particularly, to a computer based-list editor that allows a computer user to enter and arrange a collection of information items.

BACKGROUND

A computer user, such as a software developer, can often find it useful to selectively arrange a collection of information items for later use. For example, the user may wish to enter a list of text commands and place those commands in a selected order prior to execution of the commands by an application program. As another example, a software developer about to run a process in the Unix operating system may wish to selectively arrange a list of statements that specify the environment for the process. After being arranged, the collection of information items, which in both of the forgoing examples is a list of text statements, is typically exported from the list editor that created or rearranged the collection, such as to the application program for immediate processing, to data storage, or to both.

Often, the developer is mainly concerned with the development of a particular application program, and as an aside will write his or her own highly customized list editor for use with the application program being developed. Accordingly, one who uses application programs developed by different developers can be confronted with list editor that are not consistent in their behavior. Different list editor may provide confusingly different graphical user interfaces that locate input controls in different areas of the graphed use interface presented to the user. One graphical user interface may provide advanced functions, not required or appropriate for all uses of the application program, whereas the graphical user interface of another list editor may be too simple. Such inconsistencies can be confusing and lead to errors, particularly on the part of less experienced users. The user may even be tempted to rewrite portions of the list editor.

Furthermore, the author of the list editor may have written the program rather quickly, such that it is not fully de-bugged, such that under certain circumstances the list editor can interfere with the proper operation of the application program and/or vice versa. For example, the list editor may provide access for the application program such that the application program can modify the selected arrangement of the collection of information items. Providing such access can be problematic, in that one modifying the application program may unknowingly make changes that cause the application program to, under certain circumstances, modify the arrangement of the collection, unbeknownst to the user of the list editor program.

As noted above, the list editor can export the collection of information items, such as a list of commands, to an application program for subsequent processing. Should one or more of the commands have been entered incorrectly or otherwise be invalid, an error message will appear during subsequent processing of the commands and execution may be halted. Even worse, the application can simply "bomb" without conveying any meaningful error message to the user. In such circumstances, assuming the user is lead to consider that the collection of information items has caused the problem, the user must recall the list editor, re-edit the collection of information items, and re-export the whole collection for another try at processing by the application program. Unfortunately, this whole process of recalling, re-editing and re-exporting may have to be repeated. Such repetition can be wasteful and time consuming.

SUMMARY OF THE INVENTION

The present invention can provide a list editor component, typically stored on a computer readable memory apparatus, for allowing a computer user to arrange a collection of information items. The list editor component can include the following: instructions for displaying an editor window to the computer user, where the editor window includes a visual representation of a selected arrangement of the information items of the collection; instructions for receiving specification from the computer user of a new information item to be added to the collection of information items; and instructions for seeking validation of the new information item prior to adding the new information item to the collection of information items or to exporting the new information item with other information items of the collection to an application program for use thereby.

In seeking a validation of the new information item, the list editor component can communicate with the application program, such communication including receiving status information from the application program indicating whether the new information item is valid. If the status information indicates that the new information item is not valid, the list editor component can include provision for preventing the new information item from being added to the collection of information items of the list editor component.

Seeking validation can also include communicating, responsive to the receipt of a command, or instruction, from the user to add the new information item to the collection of information items, information representative of the new information to the application program, such that the application program can validate the new information item.

The present invention can also include a list editor component for allowing a computer user to arrange a collection of information items. The list editor component can include instructions for displaying, responsive to a call from an application program, an editor window to the computer user, where the editor window includes a visual representation of a selected arrangement of the information items of the collection. The list editor component can also include instructions for receiving specification from the computer user of a new information item to be added to the collection of information items, as well as instructions for, responsive to receiving an export instruction from the computer user, exporting information items of the collection to the application program for use thereby. The application program is not allowed access to the list editor component so as to be able to vary selected arrangement of the information items of the collection or, alternatively or additionally, the location of import controls of the editor window.

The invention can also provide a computer graphical user interface for a list editor component that allows a computer user to selectively arrange information items. The graphical user interface includes an editor window, where the editor window is displayable with at least one other display window representing another graphical user interface; an entry field area provided within the editor window and within which a computer user can specify a new information item to be added to the collection of information items; and a display field area within which there is displayed a representation of a selected arrangement of information items of the collection of information items. The display field area is located below the entry field area.

The graphical user interface can also include various input controls to the user, such as an ADD input control for receiving user instruction to add the new information item to the collection of information items, and can allow selection of an information item or items of the collection of information items with the pointing and selecting device. A MOVE input control can be provided for moving the selected information items in the collection of information items, and a delete input control provided for deleting the selected information items.

The ADD input control can be located to the right of the entry and display field areas and substantially aligned horizontally with the entry field area; the delete input control located below the ADD input control and to the right of the entry field and display field areas, and the MOVE input control can be located below the ADD input control and, accordingly, also to the right of the entry and display field areas.

The graphical user interface can be called by an application program, and in response to being called, the editor window displayed to the computer user. Although the graphical user interface can allow the application program to receive information items of the collection, it can refrain from allowing the application program to vary the selected arrangement of the collection of information items and/or does not allow the application program to vary the location of the input controls and field areas in the editor window.

The invention can also include methods practiced in accordance with the teachings herein.

For example, the invention can provided a computer method for allowing a computer user to edit a collection of information items. The computer method can include the steps of displaying an editor window to a computer user, where the editor window includes a visual representation of a selected arrangement of the information items of the collection of information items; receiving specification from the computer user of a new information item to be added to the collection of information items; and seeking validation of the new information item prior to adding the new information item to the collection of information items or exporting, responsive to an export command received from the application program, the new information item with other information items of the collection to the application program for use thereby.

Furthermore, the present invention can provide a computer method for allowing a computer user to edit a collection of information items. The computer method can include the steps of displaying responsive to a call from an application program, an editor window to a computer user where the editor window includes a visual representation of a selected arrangement of the information items of the collection of information items; receiving specification from the computer user of a new information item to be added to the collection of information items; receiving an export command from the computer user and, responsive thereto, for exporting information items of the collection to the application program for use thereby. In one practice, the list editor component does not allow any application program to access the list editor component so as to be able to vary the selected arrangement of the collection of information items of the list editor component, or, for example, the location of input controls or field areas provided by list editor component in the editor window.

Other features and objects of the present invention will be apparent to one of ordinary skill in light of the disclosure herein.

DETAILED DESCRIPTION

Figure 1:
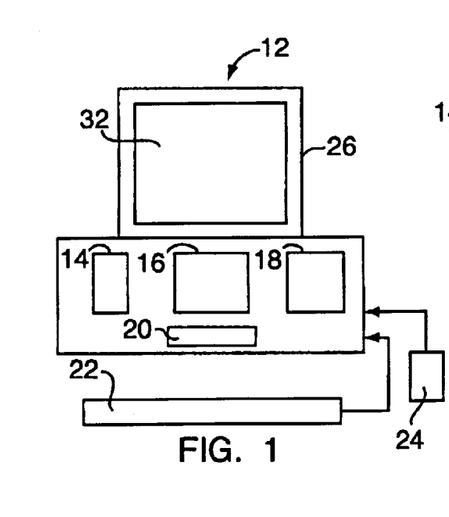
FIG. 1 is a schematic illustration of a computer system that can be used in the practice of the present invention.

The practice of the invention can include the use of the computer system 12 illustrated in FIG. 1. The computer system shown in FIG. 1 includes input/output hardware 14, which can include provision for communication over a network, a central processor 16, memory apparatus, which can include random access memory 18 and a hard disk 20, a keyboard 22, a mouse 24, and a display monitor 26 that includes the display screen 32. The computer 12 can also include a drive for reading a removable-type memory apparatus, such as a CD ROM, diskette, or tape (not shown). Also, as is well known in the art, the computer system 12 can include various other hardware, such as audio speakers, a scanner, joystick, etc. (also not shown).

The memory apparatus typically stores an operating system and at least one application program. Most application programs present a Graphical User Interface (GUI) on the screen of the display monitor 26. GUIs have become indispensable features of most modern computer programs and are popular because they allow a user to interact intuitively with the application program, typically via the manipulation of input controls, such as buttons, check boxes, scroll bars, etc. The keyboard 22 and/or the mouse 24 allow a computer user to quickly point to and select various controls. The keyboard can also be used to provide text entry, as is well known. Many other types of pointing and selecting devices are known, such as a keypad, a track ball, a pen and tablet, a touch screen displayed on the display screen of the display monitor 26, and an audio device, such as a microphone.

As can be appreciated from the foregoing discussion, the computer system 12 shown in FIG. 1 is only exemplary, and many variations are possible. For example, the computer system can include, in addition to or instead of the display monitor 26 co-located with the processor 16, a dumb terminal located remotely from the processor 16 and associated memory apparatus, including RAM 18 and disk 20. The computer system 12 can also include one or more of the components shown in FIG. 2 networked together, rather than co-located as shown in FIG. 1, such as over the Internet or an Intranet. For example, the hard disk 20 may be available over the internet.

The present invention provides a list editor component that allows a computer user to selectively arrange a collection of information items. The list editor component can be stored on the memory apparatus, such as the random access memory 18, the disk 20, or a removable memory apparatus, such as a tape, CD ROM or floppy disk. The collection of information items can be a list that is arranged by the user in a selected order, such as a list of commands to be executed by another application program or a list of specifications for specifying the environment for running a particular process. In one practice of the invention, the list editor component of the present invention can be called by a program, such as an application program, operating system, or any other type of program utilizing lists, for performing a specific task. The list editor component can export all of, or a subset of, the information items of the collection to the application program for use thereby.

Figure 2:
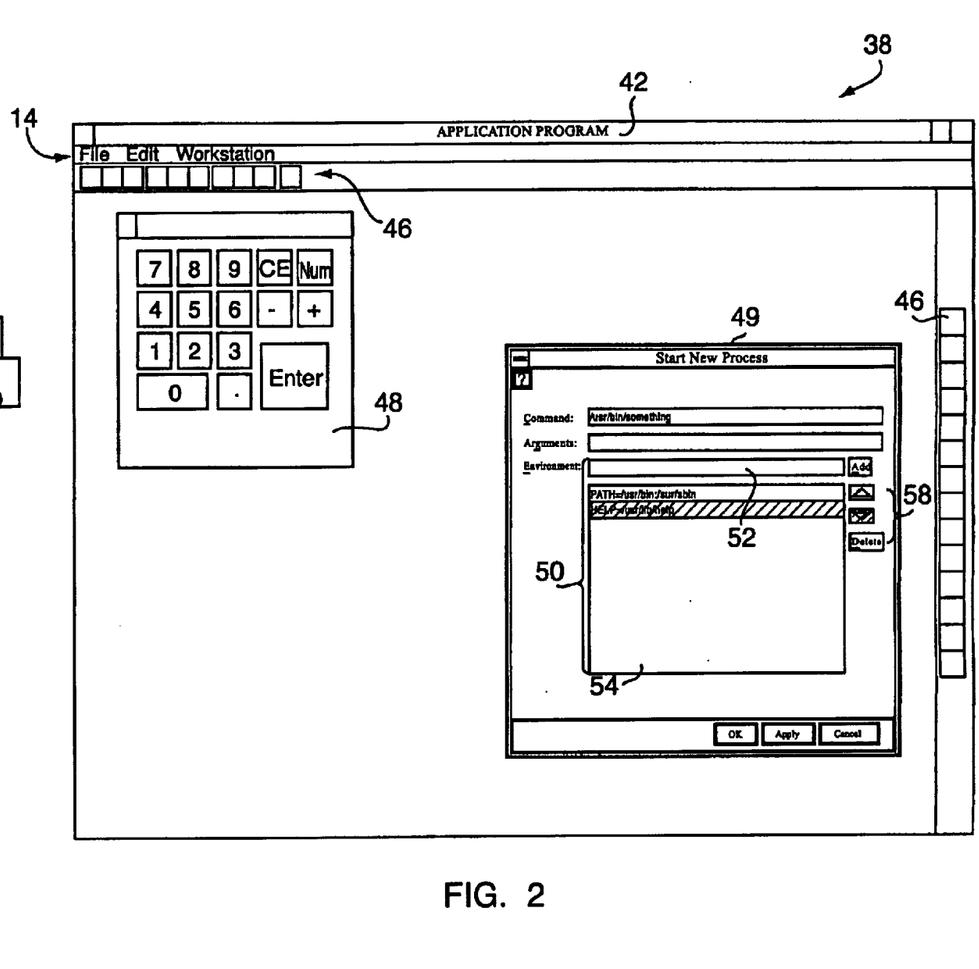
FIG. 2 is a computer display showing the editor window including a representation of the present invention overlying an application program window.

FIG. 2 illustrates a display 38, such as would be presented to a computer user on the display screen 32 of the display monitor 26, of an application program window 42. The application program window 42 includes a menu bar 44, various buttons 46, a numeric keypad window 48, and a "Start New Process" window 49, for a user to provide input instructions to the application program. Responsive to a call from an application program, in this instance the application program displaying the window 49, the list editor component of the present invention displays the editor window 50 to the computer user. In FIG. 2, the editor window 50 is shown as displayed within the application window 49, however, as is understood by one of ordinary skill in the art, the editor window 50 need not be displayed within the application window, but can be displayed on a separate or shared part of any application window on display screen 32. For example, the editor window 50 can be employed and displayed in both the "Start New Process" application window 49 and outside the "Start New Process" application window in the application window 42.

The editor window 50 can include an entry field area 52 for receiving specification from the computer user of a new information item to be added to the collection of information items, and a display field area 54 for providing a visual representation of a selected arrangement of the information items of the collection of information items. In the embodiment shown in FIG. 3, the display field area 54 is a listbox that lists text statements. The editor window 50 can also include input controls 58 for allowing the user to arrange items in the collection of items, such as by adding the specified new information item in the entry field area 52 to the collection of information items as shown in the display field area 54.

Typically the computer user will use the mouse 24 to point to and select the entry field area 52, and the keyboard 22 to type a text entry into the entry field area 52. Next, the user will select the input controls 58 to add the new information item to the collection of items visually represented in the display field area 54. Input controls 58 that allow the user to select and delete information items from the collection of information items and to return all or a subset of all of the information items of the collection to the application program can be provided. The information items are exported in a selected arrangement of the information items. For example, if the selected arrangement of information items is a list of commands to be executed in a selected order, the computer user can use the list editor component to create a list of commands that is in that order, and the application program, upon export of the commands, can process the commands in the selected order.

Figure 3:
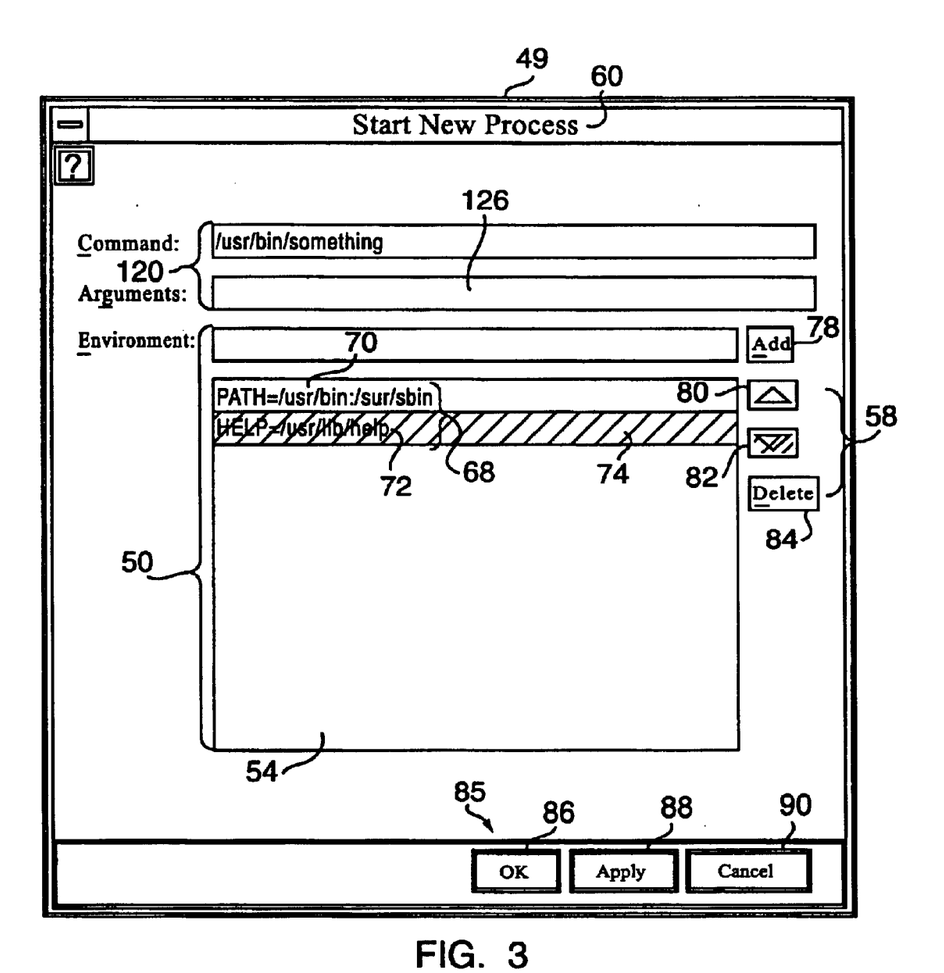
FIG. 3 is a detailed view of one embodiment employing an editor window of the present invention.

FIG. 3 provides additional detail of the editor window 50. In the embodiment of the editor window 50 shown in FIG. 3, the list editor component is being used to enter information items for specifying the environment of a Unix process. Reference number 68 indicates the visual display of a selected arrangement of the information items 70 and 72, which read, respectively, "PATH=/usr/bin:/usr/sbin" and "HELP=/usr/lib/help". Selection of information item 72 is indicated by changed visual display of that information item, indicated by reference numeral 74, which as shown in FIG. 3 can be accomplished by the highlighting horizontal bar that encompasses the information item 72.

Input controls 58 can be provided by the list editor component of the present invention for use by the user. Input controls shown include the ADD input control 78, the MOVE UP input control 80, the MOVE DOWN input control 82, and the DELETE input control 84, all of which are shown implemented as buttons in FIG. 3. Preferably, when the entry field area is empty, the ADD input control is disabled and the visual display of the ADD input control, such as the button shown in FIG. 3, is varied (e.g., the button can be "grayed out") to indicate to the user that it is inappropriate to provide an instruction to the list editor component to add a new information item to the collection. Otherwise, the list editor component can include a test condition for testing the entry field area each time an instruction is received from the user to add a new information item to the collection. Similar considerations apply to other input controls. For example, the DELETE button or the MOVE button can be disabled, and their visual display thereof changed, when no information items are selected by the user.

Application window 49 can include controls 85, which include an OK button 86, an APPLY button 88 and a CANCEL input control 90, and which are located below the bottom right of the editor window, and are provided by the application program. These controls 85 are typically not part of the editor window 50. By selecting the OK button 86 or the APPLY button 88 the user can direct that the application program import the collection of information items, or perhaps a subset thereof, from the list editor component to the application program that presented the application program window 49. The collection of information items is exported to the application program such that the selected arrangement is available to the application program. That is, if the user has deliberately placed commands or other text instructions in a selected order for use by the application program, the information items are communicated to the application program such that order can be determined and the commands processed in that order.

The list editor component thus can provide an editor window 50 that presents a standardized interface format that increases the ease and efficiency of arranging a collection of information items. As shown in FIG. 3, the display field area 54 is located below the entry field area 52, and preferably the left border of each of these areas is substantially vertically aligned. The ADD input control 78 is located to the right of the entry and display field areas, 52 and 54 respectively, and is substantially aligned horizontally with the entry field area 52. Additional input controls 58 such as the DELETE input control 84 and the MOVE UP and MOVE DOWN input controls, 80 and 82, respectively, are located below the ADD input control 78, and are substantially vertically aligned with the ADD input control 78. The editor window 50 can also be employed with other application window 49 field areas for providing information to the user or for receiving user input, such as the field areas 120 shown in FIG. 3, where the user can specify a command in entry field area 122 and an argument in entry field area 126.

Upon request of the application program, the list editor component can export the collection of information items or a subset thereof to the application program. Typically the application program will then attempt to process the arrangement of information items. Should one of the information items be invalid, e.g., should the new information item represent a non-existent path or include a syntax error, the application program generates an error message, fails to execute properly, or both. This can be time consuming and frustrating, as the computer user does not learn until he/she exports what could be a rather large collection of information items to the application program that one or more of the information items was erroneous.

Accordingly, the list editor component of the present invention includes instructions for seeking validation of the new information item prior to adding the new information item to the collection of information items and/or prior to exporting the new information item with other information items of the collection to the application program. For example, upon the user selecting the ADD input control 78, the list editor component can communicate to the application program a representation of the new information item. The application program can evaluate the representation as necessary to validate the new information item and can then provide status information to the list editor component, where the status information indicates whether the new information item is valid.

If the status information indicates that the new information item is not valid, the list editor component can include provision for preventing the new information item from being added to the collection of information items. The application program can present a dialog box that indicates that the new information item is invalid and that requires user input to be dismissed. The user can then employ the list editor component to correct the specification of the new information item in the entry field area 52. Thus, when exporting the collection of information items to the application program, the probability of errors is reduced as the information items have already been validated.

In some circumstances the user may be fairly confidant that most of the new information items that will be added to the entry field area are valid. Accordingly, there can be provided a separate input control, not shown in FIG. 3, for providing validation of the new information item currently entered into the entry field area 52. Thus the user is provided with the option of seeking validation of the new information item prior to adding it to the collection, or proceeding without validation. Similarly, an override input control can be provided, wherein the user, by selection of the override input control, can force the list editor component to add a new information item to the collection, even if the item has been flagged as invalid by the application program.

As is known by those of ordinary skill in the art, the operation of a program that includes a graphical user interface or, in particular, an object oriented program, is not always amenable to depiction by a simple flow chart. This is because the program typically responds to events such as operator input, and such input can vary considerably. For example, when using the program, a first time user may access the features of the program in an entirely different order than an experienced user. Furthermore, a given functionality of the program can be realized in a variety of ways.

Figure 4:
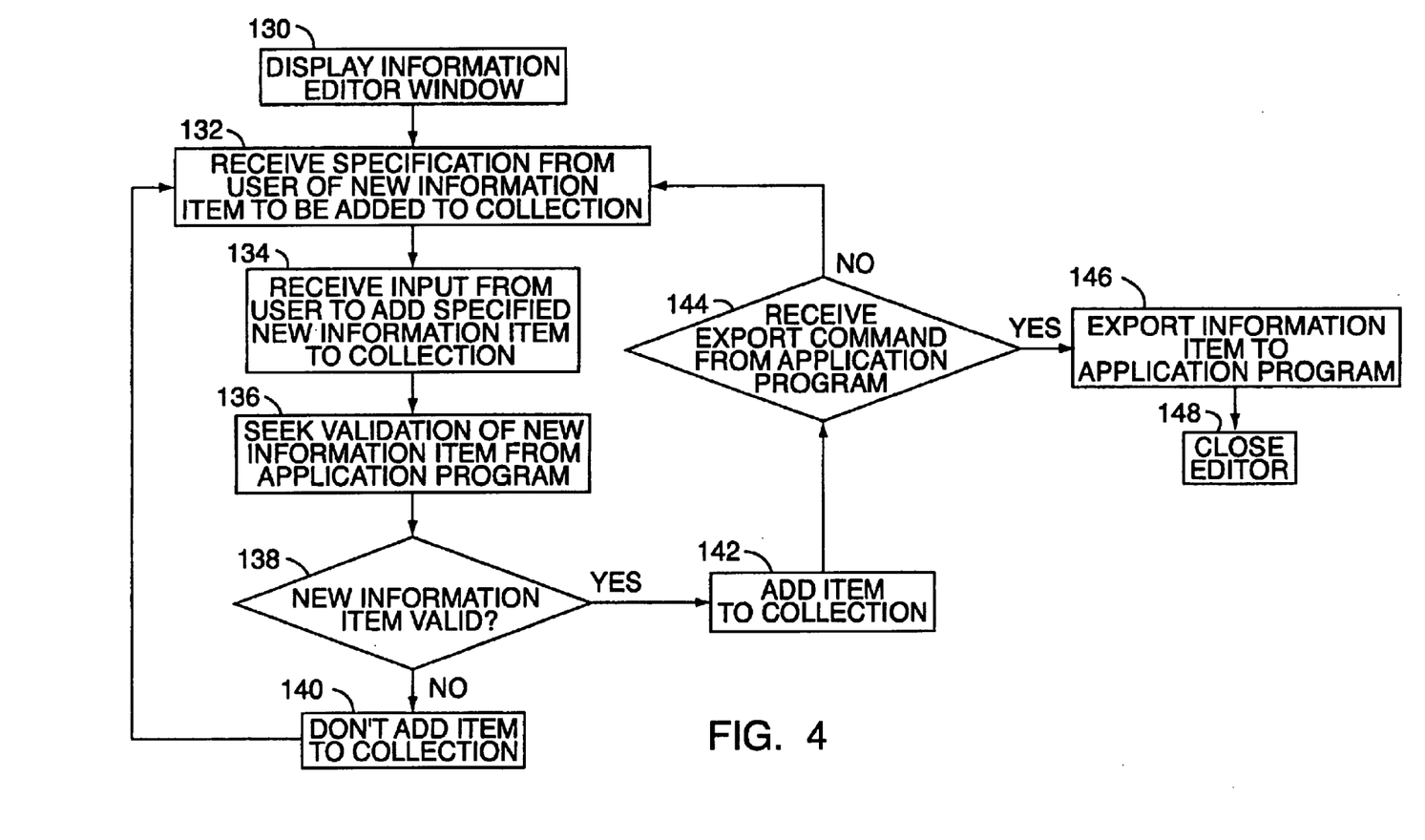
FIG. 4 is a flow chart illustrating validation of a new information item in accordance with the invention prior to adding the item to the collection of information items of the list editor component of the present invention.

Accordingly, FIG. 4 is a flow chart illustrating one manner in which the list editor component of the present invention can operate to seek validation of a new information item. Preferably, in accordance with FIG. 4, validation is sought prior to export of that information item, such as to an application program or, alternatively or additionally, prior to adding the new information item to the collection of information items.

As indicated by block 130 of FIG. 4, the list editor component, responsive to a call from an application program, displays the editor window 50. Proceeding to block 132, the list editor component receives specification from the computer user of a new information item to be added to the collection of information items. Next, the user selects the ADD input control 78 and, responsive to that selection, the list editor component, as indicated by block 136, seeks validation of the new information item from the application program according to selected criteria. Validation can be a more complex process, wherein the application program requires that more than various types of criteria be used for validation, or that more than one program validate the new information item.

Proceeding to decision block 138, if the new information item is determined not to be valid, the list editor component does not add the item to the collection, as indicated by block 140, and waits for the specification of a different new information item to be made by the user and for selection once again of the ADD input control 78. In one practice of the invention, the list editor component simply prevents any information item determined to be invalid from being added to the collection of information items; however, it is possible that in certain circumstances it is desirable for the application program to inform the computer user that the new information item is invalid and to allow the computer user to employ the list editor component to proceed to add the new information item to the collection of information items, as noted above.

Returning to decision block 138, if the new information item is determined to be valid, the item can be added to the collection by the list editor component as indicated by block 142. Should the user be done in arranging a collection of information items as desired, responsive to an export command from the application program, the collection of information items, or a sub-set thereof, can be exported to the application program, as indicated by block 146. Returning to decision block 144, the user simply specifies the next new information item to be added to the collection. Of course, at any time during this process the user can elect to delete or move information items in the collection via the additional input controls 58 shown in FIG. 3.

Preferably, the list editor component does not allow any application program, such as the application program that displays application window 49, anything but very limited access to the collection of information items maintained by the list editor component. For example, it is preferable that the application program cannot be allowed to vary the selected arrangement of the information items of the collection of information items maintained by the list editor component. Furthermore, it is preferable that the application program not be allowed to vary the presentation of the editor window 58, that is, not be allowed to vary the location and presentation of the input controls 58 and/or of the entry field area 52 and the display field area 54. Accordingly, the present invention provides the user with a standard graphical user interface with which he/she can become familiar. Such standardization of presentation of the editor window reduces the chance of erroneous entry or arrangement of information items. The list editor component is thus preferably a "black box" that only allows selected access, and ensures that most of its internal software components cannot be accessed.

The list editor component can be implemented via object oriented programming techniques in a language such as Java. Preferably, the list editor component is implemented as a Java class, and the "black box" behavior implement by providing a public interface that limits the application program, upon instantiating an object of the class, to do little or no more than the following: 1) re-initialize the information items of the collection of information items (that is, simply reload a predetermined set of information items into the collection of information items of the editor such that they are displayed in the display field area 54); 2) specify at least one listener for listening for user input (e.g., such a listener can be used to provide context-sensitive help, or for validating an information item); 3) configure the editor to provide the MOVE UP and MOVE DOWN buttons 80 and 82, respectively, or alternatively, to refrain from providing such buttons (in certain circumstances it may not be desirable to allow the computer user to vary the selection of the arrangement of the information items in the collection once they are entered or have been initialized by the application program); 4) localize the information items with respect to a specified resource (i.e., decide in which language the information items will be presented to the user, as well as other text of the information window); and 5) specify the number of at least one of rows and columns of the of the display field area 54 and the entry field area 52. For example, it may be useful that the information items in the visual display area 54 are arranged in rows and columns. In such a circumstance the list editor component would also typically arrange one row of columns in the entry field area 52, and have the boundaries of the columns in the entry field area 52 line up visually with the columns displayed in the visual display area 54. Finally, it may also be useful to allow the application program to read at least one information item from the collection of information items.

Furthermore, it may be useful for the application program to be able to specify whether validation of new information items must be performed. In one practice of the invention, an application program can select one of various options. In one option, a user override control is provided, wherein the user, by selecting the control, allows a new information item to be added to the collection of information items without prior validation, or to be added despite a failure of the item to be properly validated after validation has been sought. As another option, a validation input control can be provided wherein, by selection of the control, the user causes validation to be sought for the new information item, and, absent selection of the control, new information items specified by the user are added to the collection.

However, as noted above, a public interface that allows the application program to vary the arrangement of the collection of information items, or to vary the visual presentation of the editor window 50, is preferably avoided. This avoids the introduction of bugs or other undesirable operation wherein the application program may interfere with the operation of the list editor component and vice versa.

As previously noted, preferably the list editor component of the present can be implemented as a class using the JAVA programming language, and has a limited public interface. Shown below is a JAVA description of the limited public interface and typical variable parameter names that are used to specify the limited nature of the public interface.

Public Interface Description

```
/**
* Construct an editor panel and initialize the listbox with
* values from the specified vector. The listbox values are
* not localized. Ordering of the listbox is enabled.
*
* @param vOutKeys the vector of strings to initialize the
    listbox
*/
public JListEditor(Vector vOutKeys)
/**
* Construct an editor panel and initialize the listbox with
* values from the specified vector. The listbox values are
* not localized. Ordering of the listbox can be specified.
*
* @param vOutKeys the vector of strings to initialize the
    listbox
* @param bOrdering true if ordering of the listbox is
    allowed,
* false if ordering not allowed.
*/
public JListEditor(Vector vOutKeys, boolean bOrdering)
/**
* Construct an editor panel and initialize the listbox with
* values from the specified vector. The listbox values are
* localized with respect to the resource name specified.
* Ordering of the listbox is enabled.
*
* @param vOutKeys the vector of strings to initialize the
    listbox
* @param bundleName the resource name to localize the
    listbox entries
*/
public JListEditor(Vector vOutKeys, String bundleName)
/**
* Construct an editor panel and initialize the listbox with
* values from the specified vector. The listbox values are
* localized with respect to the resource name specified.
* Ordering of the listbox can be specified.
*
* @param vOutKeys the vector of strings to initialize the
    listbox
* @param bundleName the resource name to localize the
    listbox entries
* @param bOrdering true if ordering of the listbox is
    allowed,
* false if ordering not allowed
*/
public JlistEditor (Vector vOutKeys, String bundleName,
    boolean bOrdering)
/**
* Set the number of columns for the input text field and
    listbox.
*
* @param columns the number of columns
*/
public void setColumns(int columns)
/**
* Set the number of visible rows for the listbox.
*
* @param visibleRows the number of visible rows
*/
public void setVisibleRows(int visibleRows)
/**
* Set the focus listeners for the components in the editor
    panel that
* can have unique help that may be context-specific. Client
    apps
* should call this method after the JListEditor is created, but
    before its
* parent container is shown. Any of the listener arguments
    can be null,
* if the client app can accept the default help for the
    particular
* component.
*
* @param inTextListener listener for the input text field
* @param listBoxListener listener for the listbox
* @param addButtonListener listener for the add button
* @param deleteButtonListener listener for the delete button
* @param upButtonListener listener for the move-up button
* @param downButtonListener listener for the move-down
    button
* @see ContextHelpListener
*/
    (FocusListener inTextListener,
    FocusListener listBoxListener,
    FocusListener addButtonListener,
    FocusListener deleteButtonListener,
    FocusListener upButtonListener,
    FocusListener downButtonListener)
/**
* Return the contents of the listbox. The values
* are the keys for the localized display text, not the actual
    display
* text. Of course if localization failed, then the keys are the
    display
* text.
*
* @return the values of the listbox
*/
public Vector getOutItems( )
/**
```

```
* Set the listbox with the values from the specified vector.
*
* @param vKeys vector of value keys
*/
public void setOutItems (Vector vKeys)
/**
* Set the listener which will receive notification when the
    Add button
* is clicked. This listener is responsible for verifying
    whether the
* value input by the user is valid. The listener can retrieve
    the value
* for examination via the getActionCommand( ) method of
    the ActionEvent
* the listener receives. If the value is acceptable, the listener
    should
* call acceptInput(true) on the JListEditor instance. If it is
    not
* valid, the listener should call acceptInput(false), and is
    responsible
* for notifying the user.
* If the client does not specify a verify listener, the default
    listener
* accepts all values unconditionally.
*
* @param 1 the client's listener
*/
public void setVerifyListener (ActionListener 1)
/**
* This method should be called by the verifyListener when
    an input
* value in the textfield has been verified. If the value is
    acceptable,
* the listener should call acceptInput(true) on the JlistEditor
    instance.
* If it is not valid, call acceptInput(false). The listener is
* responsible for notifying the user about invalid values.
*
@param bAccept true if the value has been verified as valid
    and
* the value should be added to the listbox; false
* if the value is rejected.
*/
public void acceptInput(boolean bAccept)
/**
* Set the label component for this JListEditor. Essentially
* performs the same function as JLabel.setLabelFor( ), but
* since the client does not have access to the text field, we
    do it.
*
* @param label the component label
*/
public void setLabel(JLabel label)
```

It will thus be seen that the invention obtains the objects set forth above, including those made apparent from the preceding description. Because certain changes may be made in the above construction without departing from the scope of the invention, it is intended that all matter contained in the above description and shown in the accompanying drawings be interpreted as illustrative and not in a limiting sense.

For example, the editor window shown in FIG. 3, the first and second information items 70 and 72 are text statements, and were identically specified as such in the entry field area 70; that is the user specified an environment statement in the entry field area 52 and that exact same statement is added to the collection upon user selection of the ADD input control 78. However, as is appreciated by one of ordinary skill in the art, in light of the disclosure herein, the specification by the user of a new information item to be added to the collection need not be identical to the new information item itself. For example, the collection of information items can be a collection of objects, such as graphics files (e.g., .pdf, .jpeg, or .gif files) or audio visual files. The user may enter a symbol to represent the file, such as a name for the file. The file itself is then added to the collection responsive to selection of the ADD input control 78. Thus the present invention is not intended to be limited to text statements, but can include any type of object or information that may be manipulated by a computer.

While the graphical user interface (GUI) displayed by the list editor component has been shown and described having rectangular display and entry areas, and rectangular input controls, the present invention is not so limited, as any graphical user interface which has a standardized interface format may be used, such as a graphical user interface having round input controls, or triangular display field or entry field areas, or having input controls underneath the entry field area, may be used without departing from the broader aspects of the present invention.

While the list editor component has been shown and described employed with the application program displaying the "Start New Process" window, the present invention is not so limited, as the application program and "Start New Process" window is only an example of a use of the list editor component. The list editor component may be employed by any program utilizing lists of information items, such as operating systems, without departing from the broader aspects of the present invention.

It is also to be understood that the following claims are intended to cover generic and specific features of the invention described herein and all statements of scope of the invention which is a matter of language may be said to fall therebetween.

Having described the invention, what is claimed is new and secured by Letters Patent is:

1. A computer readable memory apparatus, comprising:
    a list editor component stored on said memory apparatus and for allowing a computer user to arrange a collection of information items, said list editor component including:
        instructions for displaying an editor window to the computer user, said editor window including a visual representation of a selected arrangement of the information items of the collection of information items;
        instructions for receiving specification from the computer user of a new information item to be added to said collection of information items;
        instructions for seeking validation of the new information item prior to at least one of a) adding the new information item to the collection of information items and b) exporting, responsive to an export command received from an application program, the new information item with other information items of the collection to the application program for use thereby; and
        wherein said list editor component is implemented as a class having a public interface that limits the application program when instantiating an object of said class.

2. The apparatus of claim 1 wherein said instructions for seeking validation include
    instructions for communicating with the application program, including receiving status information from the application program indicating whether said new information item is valid.

3. The apparatus of claim 1 wherein said instructions for seeking validation include instructions for communicating with the application program, including receiving status information from the application program indicating whether said new information item is valid; and instructions for, when said status information indicates that said new information item is not valid, preventing said new information item from being added to said collection of information items.

4. The apparatus of claim 1 wherein said program includes instructions for receiving from the computer user an add command to add the new information item to the collection of information; and wherein said instructions for seeking validation include instructions for communicating, responsive to the receipt of said add command, information representative of said new information item to the application program such that the application program can validate said new information item.

5. The apparatus of claim 1 wherein said list editor component includes instructions for providing an add input control within said editor window for, responsive to selection of said add input control, adding the new information item to said collection;

instructions for allowing selection of an information item of said collection of information items with a user operated pointing and selecting device; and instructions for providing a delete input control for being selected by the user, and for deleting said selected information item from the collection of information items responsive to the selection of said delete input control.

6. The apparatus of claim 5 wherein said list editor component includes:

instructions for providing at least one move input control for moving the selected information item within the arrangement of information item of said collection responsive to the selection of said move input control.

7. The apparatus of claim 1 wherein said list editor component includes instructions for, responsive to a request for export by the application program, for exporting information items of said collection to the application program.

8. The apparatus of claim 1 wherein said editor window can be displayed, responsive to a call from the application program, for use of the list editor component by the user.

9. The apparatus of claim 1 wherein said list editor component does not allow said application program to vary the selected arrangement of said collection of information items of said list editor component.

10. The apparatus of claim 1 wherein said list editor component includes at least one input control located within said editor widow for providing user input to said list editor component, and wherein said list editor component does not allow the application program to vary the location of any input controls displayed in said editor window.

11. A computer readable memory apparatus, comprising:

a list editor component stored on said memory apparatus and for allowing a computer user to arrange a collection of information items, said list editor component including:

instructions for displaying an editor window to the computer user, said editor window including a visual representation of a selected arrangement of the information items of the collection of information items;

instructions for receiving specification from the computer user of a new information item to be added to said collection of information items;

instructions for seeking validation of the new information item prior to at least one of a) adding the new information item to the collection of information items and b) exporting, responsive to an export command received from an application program, the new information item with other information items of the collection to the application program for use thereby; and wherein said list editor component is implemented as a class having a public interface that is limited such that an application program when instantiating an object of said class has access to do no more than the following: reinitializing the information items of said collection, specifying at least one listener for listening for user input, specifying whether the list editor component, when instantiated, will allow a user to move an information item within the collection of information items to vary the selected arrangement of the information items; localizing the information items with respect to a specified resource, specifying the number of at least one of rows and columns of said visual representation of said collection presented to the computer user, and reading at least one information item from the collection of information items.

12. A computer readable memory apparatus, comprising:

a list editor component stored on said memory apparatus and for allowing a computer user to arrange a collection of information items, said list editor component including;

instructions for displaying, responsive to a call from an application program, an editor window to the computer user, said editor window for including a visual representation of a selected arrangement of the information items of the collection of information items;

instructions for receiving specification from the computer user of a new information item to be added to said collection of information items;

instructions for receiving an export command from the application program and for exporting information items of said collection to said application program for use thereby and such that said application program can access said selected arrangement of said information items of said collection;

wherein said list editor component does not allow any application program to access said list editor component so as to be able to vary said selected arrangement of said collection of information items of said list editor component; and wherein said list editor component is implemented as a class having a public interface that limits the application program when instantiating an object of said class.

13. The apparatus of claim 12 wherein said list editor component includes at least one input control for being pointed to and selected by the user and for receiving a command from the user via selection of the input control, and wherein said list editor component does not allow the application program to vary the location of any input controls.

14. The apparatus of claim 12 wherein said list editor component includes instructions for providing an add input control within said editor window for, responsive to selection of said add input control, adding said new information item to said collection;

instructions for allowing selection of an information item of said collection of information items with a user operated pointing and selecting device; and instructions for providing a delete input control for being selected by the user and for deleting said selected information item from the collection of information items responsive to user selection of the delete input control.

15. The apparatus of claim 12 wherein said list editor component does not allow said application program to access the collection of information items of said list editor component other than to one of reinitialize said collection and read information items of said collection.

16. A computer readable memory apparatus, comprising:
a list editor component stored on said memory apparatus and for allowing a computer user to arrange a collection of information items, said list editor component including;
    instructions for displaying, responsive to a call from an application program, an editor window to the computer user, said editor window for including a visual representation of a selected arrangement of the information items of the collection of information items;
    instructions for receiving specification from the computer user of a new information item to be added to said collection of information items;
    instructions for receiving an export command from the application program and for exporting information items of said collection to said application program for use thereby and such that said application program can access said selected arrangement of said information items of said collection;
wherein said list editor component does not allow any application program to access said list editor component so as to be able to vary said selected arrangement of said collection of information items of said list editor component; and
wherein said list editor component is implemented as a class having a public interface that limits the application program when instantiating an object of said class to do no more than the following: reinitializing the information items of said collection, specifying at least one listener for listening for user input, specifying whether the list editor components when instantiated will allow a user to move an information time within the collection of information items to vary the order of the information items; localizing the information items with respect to a specified resource, specifying the number of at least one of rows and columns of said representation of said collection presented to the computer user, and reading at least one information item from the collection of information items.

17. A computer graphical user interface for a list editor component that allows a computer user to selectively arrange a collection of information items, comprising:
    an editor window, said editor window being displayable with at least one other display window representing another graphical user interface;
    an entry field area within said editor window and within which a computer user can specify a new information item to be added to the collection of information items;
    a display field area, within said editor window, within which there is displayed a representation of a selected arrangement of information items of said collection of information items, said display field area being located below said entry field area;
    an add input control for being selected via a pointing and selecting device, and for receiving user input, via selection thereof, that the new information item specified in said entry field area is to be added to said collection of information items, said add input control being located to the right of said entry and display field areas and substantially aligned horizontally with said entry field area;
    a delete input control for being selected by the user, and for receiving an instruction, via the selection thereof, that an information item selected with the pointing and selecting device is to be deleted, said delete input control being located below said add input control and to the right of said entry field area and said display field area; and
    wherein said list editor component is implemented as a class having a public interface that limits the application program when instantiating an object of said class.

18. The graphical user interface of claim 17 including at least one move input control for receiving an instruction, via the selection thereof by the user, that the selected information item is to be moved, and for moving the selected information item within the arrangement of information items of said collection responsive to the selection of the move input control by the user.

19. The graphical user interface of claim 17 including wherein the display of the add input control is varied when the entry field area does not include an entry so as to indicate to the computer user that addition to the collection is inappropriate.

20. The graphical user interface of claim 17 wherein said graphical user interface can be called by an application program, and responsive to being called, is displayed to the computer user, and wherein said graphical user interface allows the application program to receive information items of the collection but does not allow the application program to vary the location of said input controls and field areas in said editor window.

21. The graphical user interface of claim 17 wherein said graphical user interface can be called by an application program, and responsive to being called, is displayed to the computer user, and wherein said graphical user interface allows the application program to receive information items of the collection but does not allow the application program to vary the selected arrangement of the information items of said collection of information items.

22. A computer method for allowing a computer user to edit a collection of information items, comprising:
    displaying an editor window to a computer user, the editor window including a visual representation of a selected arrangement of the information items of the collection of information items;
    receiving specification from the computer user of a new information item to be added to the collection of information items;
    seeking validation of the new information item prior to at least one of a) adding the new information item to the collection of information items and b) exporting, responsive to a export command received from an application program, the new information item with other information items of the collection to the application program for use thereby; and
    wherein said editor window is implemented as a class having a public interface that limits the application program when instantiating an object of said class.

23. The method of claim 22 wherein seeking validation includes
    receiving status information from the application program indicating whether the new information item is valid.

24. The method of claim 22 wherein seeking validation includes
    receiving status information from the application program indicating whether the new information item is valid; and when the status information indicates that the new information item is not valid, preventing the new information item from being added to the collection of information items.

25. The method of claim 22 including receiving from the computer user an add command to add the new information item to the collection of information; and wherein seeking validation includes communicating, responsive to the receipt of the add command, information representative of the new information item to the application program such that the application program can validate the new information item.

26. The method of claim 22 including providing an add input control within the editor window for, responsive to selection of the add input control, adding the new information item to the collection;

allowing selection of an information item of the collection of information items with a user operated pointing and selecting device; and providing a delete input control for responsive to the selection thereof by the user, deleting the selected information item from the collection of information items.

27. The method of claim 26 including providing at least one move input control for moving the selected information item within the arrangement of information item of the collection responsive to the selection of the move input control.

28. The method of claim 22 including exporting information items of the collection to the application program, responsive to an export command from the application program.

29. The method of claim 22 including displaying the editor window for viewing thereof by the computer user responsive to a call from the application program.

30. The method of claim 22 wherein the list editor component does not allow the application program to vary the selected arrangement of the collection of information items.

31. The method of claim 22 wherein the list editor component includes at least one input control located within the editor window for providing user input to the list editor component, and wherein the list editor component does not allow the application program to vary the location of any input controls displayed in the editor window.

32. The method of claim 22 wherein the list editor component does not allow the application program to access the collection of information items other than one of reinitializing the collection and reading information items from the collection.

33. A computer method for allowing a computer user to edit a collection of information items, comprising:

displaying, responsive to a call from an application program, an editor window to a computer user, the editor window including a visual representation of a selected arrangement of the information items of the collection of information items;

receiving specification from the computer user of a new information item to be added to the collection of information items;

instruction for receiving an export command from the application program and for exporting information items of the collection to the application program, for use thereby, and such that the application program can determine the selected arrangement of the information items; and wherein the list editor component does not allow any application program to access the list editor component so as to be able to vary the selected arrangement of the collection of information items of the list editor component.

34. The method of claim 33 wherein the list editor component includes at least one input control for being pointed to and selected by the user and for receiving a command from the user via selection of the input control, and wherein the list editor component does not allow the application program to vary the location of any input controls and does not allow the application program to vary the display representative of the collection presented to the computer user in the editor window.

* * * * *